United States Patent
Urano

(10) Patent No.: US 9,318,980 B2
(45) Date of Patent: *Apr. 19, 2016

(54) PIEZOELECTRIC ACTUATOR, ROBOT HAND, AND ROBOT

(75) Inventor: Osamu Urano, Okaya (JP)

(73) Assignee: Seiko Epson Corporation (JP)

( * ) Notice: Subject to any disclaimer, the term of this patent is extended or adjusted under 35 U.S.C. 154(b) by 411 days.

This patent is subject to a terminal disclaimer.

(21) Appl. No.: 13/487,625

(22) Filed: Jun. 4, 2012

(65) Prior Publication Data

US 2012/0316674 A1 Dec. 13, 2012

(30) Foreign Application Priority Data

Jun. 7, 2011 (JP) ................................. 2011-127024

(51) Int. Cl.
| | | |
|---|---|---|
| G06F 19/00 | (2011.01) | |
| H02N 2/10 | (2006.01) | |
| B25J 15/00 | (2006.01) | |
| H02N 2/00 | (2006.01) | |
| H02N 2/14 | (2006.01) | |

(52) U.S. Cl.
CPC ................. *H02N 2/103* (2013.01); *B25J 15/00* (2013.01); *H02N 2/003* (2013.01); *H02N 2/14* (2013.01)

(58) Field of Classification Search
CPC .................................. H02N 2/14; G06F 19/00
USPC .................................. 700/245; 310/316–317
See application file for complete search history.

(56) References Cited

U.S. PATENT DOCUMENTS

| | | | |
|---|---|---|---|
| 5,130,619 A * | 7/1992 | Izuno | ............................ 318/116 |
| 5,233,274 A | 8/1993 | Honda et al. | |
| 5,539,268 A * | 7/1996 | Kataoka | ................... 310/316.02 |
| 5,563,478 A * | 10/1996 | Suganuma | ..................... 318/116 |
| 6,196,350 B1 | 3/2001 | Minto | |
| 6,265,809 B1 | 7/2001 | Fujii et al. | |
| 6,437,480 B1 | 8/2002 | Saya | |
| 6,812,618 B2 * | 11/2004 | Hayashi | ................... 310/316.01 |
| 7,119,475 B2 | 10/2006 | Matsuzaki et al. | |
| 7,535,153 B2 | 5/2009 | Urano | |
| 7,545,076 B1 | 6/2009 | Hills et al. | |
| 7,675,218 B2 | 3/2010 | Kawaguchi et al. | |
| 8,905,624 B1 | 12/2014 | Howe et al. | |
| 2002/0171410 A1 * | 11/2002 | Akahane et al. | ........... 324/76.49 |

(Continued)

FOREIGN PATENT DOCUMENTS

| | | |
|---|---|---|
| JP | 01-148080 | 6/1989 |
| JP | 01-209967 | 8/1989 |

(Continued)

*Primary Examiner* — Khoi Tran
*Assistant Examiner* — Harry Oh
(74) *Attorney, Agent, or Firm* — Harness, Dickey & Pierce, P.L.C.

(57) ABSTRACT

A piezoelectric actuator includes a vibrating body including a piezoelectric device; a driving circuit that supplies a driving signal to the piezoelectric device; a phase difference detecting circuit that detects a phase difference between the driving signal and a detection signal detected based on vibration of the vibrating body; and a frequency controller that controls the frequency and power of the driving signal, wherein the frequency controller sets the power to an upper limit voltage value when the frequency is changed so that the phase difference falls within a predetermined range and sets the voltage to a lower limit voltage value smaller than the upper limit voltage value when the phase difference is outside the predetermined range.

8 Claims, 10 Drawing Sheets

(56) References Cited

U.S. PATENT DOCUMENTS

| | | |
|---|---|---|
| 2005/0067921 A1 | 3/2005 | Yamamoto |
| 2005/0110368 A1* | 5/2005 | Varadi et al. ............. 310/316.02 |
| 2005/0127790 A1 | 6/2005 | Magnussen et al. |
| 2005/0231069 A1 | 10/2005 | Yamazaki et al. |
| 2005/0240952 A1 | 10/2005 | Goossens et al. |
| 2006/0113863 A1* | 6/2006 | Kawaguchi et al. .......... 310/314 |
| 2006/0267452 A1 | 11/2006 | Diefenbach et al. |
| 2007/0046144 A1* | 3/2007 | Urano ........................... 310/317 |
| 2007/0159507 A1* | 7/2007 | Urano ............................. 347/20 |
| 2007/0194660 A1* | 8/2007 | Hashimoto ............. 310/316.01 |
| 2007/0278976 A1* | 12/2007 | Kawaguchi et al. .......... 318/116 |
| 2009/0009109 A1 | 1/2009 | Hashimoto |
| 2009/0021113 A1* | 1/2009 | Negishi et al. ........... 310/323.02 |
| 2009/0066187 A1* | 3/2009 | Kudo ..................... 310/316.02 |
| 2009/0167704 A1* | 7/2009 | Terlizzi et al. ................. 345/173 |
| 2009/0167817 A1* | 7/2009 | Orr .................................. 347/37 |
| 2009/0206699 A1 | 8/2009 | Osano |
| 2009/0224630 A1 | 9/2009 | Adachi et al. |
| 2009/0243431 A1 | 10/2009 | Ohsawa |
| 2010/0177603 A1 | 7/2010 | Kitahara et al. |
| 2010/0289381 A1 | 11/2010 | Xu et al. |
| 2011/0068718 A1 | 3/2011 | Murakami |
| 2012/0209303 A1 | 8/2012 | Frankhouser et al. |
| 2012/0228994 A1 | 9/2012 | Wischnewskiy et al. |

FOREIGN PATENT DOCUMENTS

| | | |
|---|---|---|
| JP | 01-295782 A | 11/1989 |
| JP | 07-222466 | 8/1995 |
| JP | 09-065673 | 3/1997 |
| JP | 09-163764 | 6/1997 |
| JP | 11-018449 | 1/1999 |
| JP | 11-018460 | 1/1999 |
| JP | 2000-092869 A | 3/2000 |
| JP | 2003-033056 A | 1/2003 |
| JP | 2007-151378 | 6/2007 |
| JP | 2009-219212 | 9/2009 |
| JP | 2010-226883 | 10/2010 |
| JP | 2010-252471 A | 11/2010 |
| WO | WO2004/088830 | 10/2004 |

* cited by examiner

PIEZOELECTRIC ACTUATOR, ROBOT HAND, AND ROBOT

BACKGROUND

1. Technical Field

The invention relates to a piezoelectric actuator, a robot hand, and a robot.

2. Related Art

A piezoelectric actuator using resonance of a vibrating body including a piezoelectric device is driven with high efficiency by setting the frequency of a driving signal supplied to the piezoelectric device so as to approach the resonance frequency of the vibrating body. Since the resonance frequency of the vibrating body varies with changes in ambient temperature or load, there is disclosed a configuration of a piezoelectric actuator in which whenever activated, the frequency of a driving signal is changed and adjusted to the resonance frequency to thereby create a state where the piezoelectric actuator is driven with high efficiency quickly (for example, see JP-A-11-18449).

In the piezoelectric actuator disclosed in JP-A-11-18449, among the frequency of a driving signal, a longitudinal vibration driving voltage, and a flexural vibration driving voltage during low-speed driving, after only the frequency is changed, the flexural vibration driving voltage is increased to increase the rotating speed while maintaining the frequency and the longitudinal vibration driving voltage. In this way, a wide dynamic range from low-speed driving to high-speed driving is realized.

However, when the frequency of the driving signal is changed at the time of activation, the piezoelectric actuator passes through a frequency range where the piezoelectric actuator is not in a stable driving state. In such a frequency range, since it is difficult for the sliding portion of the piezoelectric actuator to follow a normal elliptical orbit, the reverse rotation, the abrasion of the distal end of the sliding portion, and the like may occur. In the worst case, the sliding portion may be destroyed. As a result, it becomes difficult to reliably activate the piezoelectric actuator in a stable state.

SUMMARY

An advantage of some aspects of the invention is to solve at least a part of the problems described above, and the invention can be implemented as the following forms or application examples.

Application Example 1

This application example of the invention is directed to a piezoelectric actuator including: a vibrating body including a piezoelectric device; a sliding portion formed in the vibrating body and makes contact with a driven body; a driving unit that supplies a driving signal to the piezoelectric device; a phase difference detector that detects a phase difference between the driving signal and a detection signal detected based on vibration of the vibrating body; and a control unit that controls the frequency and power of the driving signal, wherein the control unit sets the power to a predetermined value when the frequency is changed so that the phase difference falls within a predetermined range and sets the power to a value smaller than the predetermined value when the phase difference is outside the predetermined range.

In the above piezoelectric actuator, in the sweeping control of changing the frequency of the driving signal, when the phase difference between the driving signal and the detection signal is outside a predetermined range, the power of the driving signal is set to be smaller than the value when the phase difference is within the predetermined range. Therefore, in a frequency range where the sliding portion is not likely to follow a normal elliptical orbit when the phase difference is outside the predetermined range, the vibration of the vibrating body can be suppressed more than when the phase difference is in a stable driving state within the predetermined range. In this way, since the reverse rotation, the abrasion and destruction of the distal end of the sliding portion, and the like resulting from the inability of the sliding portion to follow a normal elliptical orbit are suppressed, it is possible to reliably activate the piezoelectric actuator in a stable state.

Application Example 2

In the piezoelectric actuator according to the above application example, it is preferable that the control unit control a voltage as the power.

According to this configuration, it is possible to control the power of the driving signal easily by controlling the voltage.

Application Example 3

In the piezoelectric actuator according to the above application example, it is preferable that the control unit control a current as the power.

According to this configuration, even when the impedance of the vibrating body varies, since the power can be maintained to be substantially constant, it is possible to stabilize the torque of the piezoelectric actuator and the rotating speed of the driven body.

Application Example 4

In the piezoelectric actuator according to the above application example, it is preferable that the control unit performs control of increasing or decreasing the frequency based on a difference between the phase difference and a predetermined reference value when the phase difference is within the predetermined range.

According to this configuration, since the driving signal is increased or decreased based on a difference between the phase difference and the predetermined reference value, even when the resonance frequency varies so that the phase difference deviates from the predetermined reference value, it is possible to maintain a stable driving state of the piezoelectric actuator by adjusting the frequency so that the phase difference approaches the predetermined reference value.

Application Example 5

This application example of the invention is directed to a robot hand including the above piezoelectric actuator.

According to this configuration, since the robot hand includes the piezoelectric actuator capable of being activated in a stable state and maintaining a stable driving state, it is possible to provide a robot hand which performs a pivot operation of the fingers grasping a member in a stable state.

Application Example 6

This application example of the invention is directed to a robot including the above robot hand.

According to this configuration, it is possible to provide a robot which can perform the pivot operation of fingers grasping a member in a stable state.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a piezoelectric actuator according to an embodiment of the invention will be described with reference to the accompanying drawings. In the respective reference drawings, the scales and dimensions of respective constituent components may sometimes differ from those of the actual constituent components so that the structure thereof can be understood easily.
First Embodiment
Piezoelectric Actuator First, a schematic configuration of a piezoelectric actuator according to a first embodiment will be described.

Figure 1A:
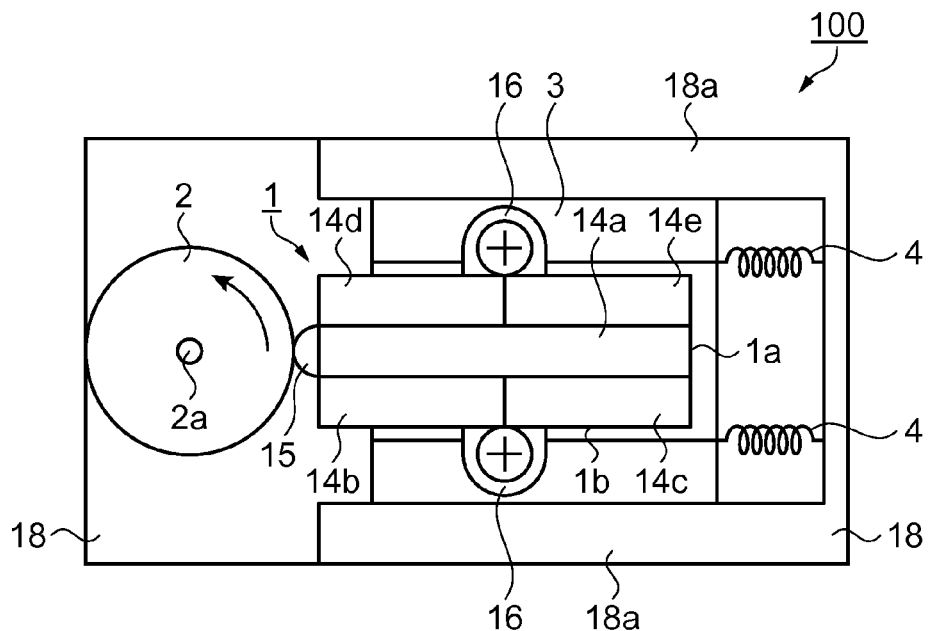
FIGS. 1A and 1B are schematic diagrams illustrating a configuration of a piezoelectric actuator according to a first embodiment.
Figure 1B:
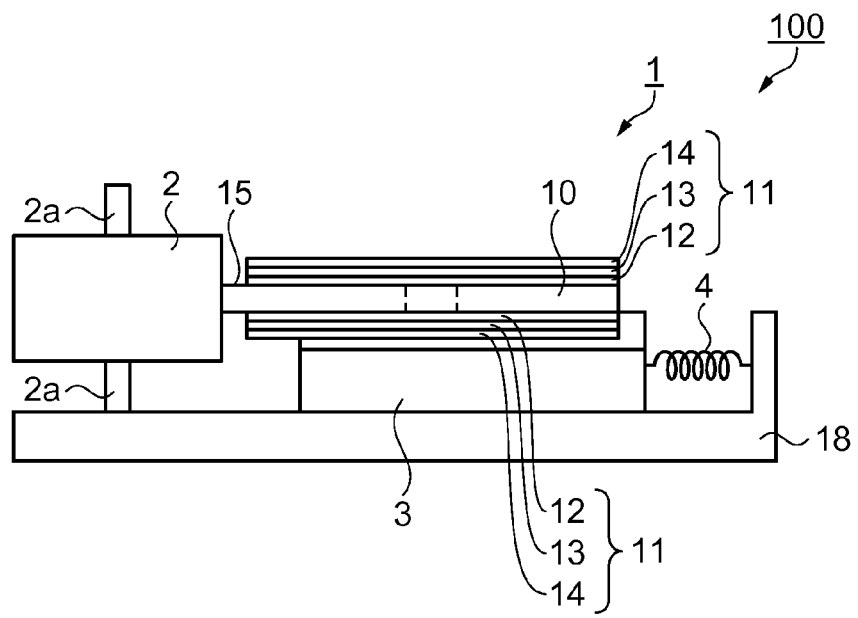

FIGS. 1A and 1B are schematic diagrams illustrating the configuration of the piezoelectric actuator according to the first embodiment. Specifically, FIG. 1A is a plan view of the piezoelectric actuator, and FIG. 1B is a side view of the piezoelectric actuator.

Figure 3:
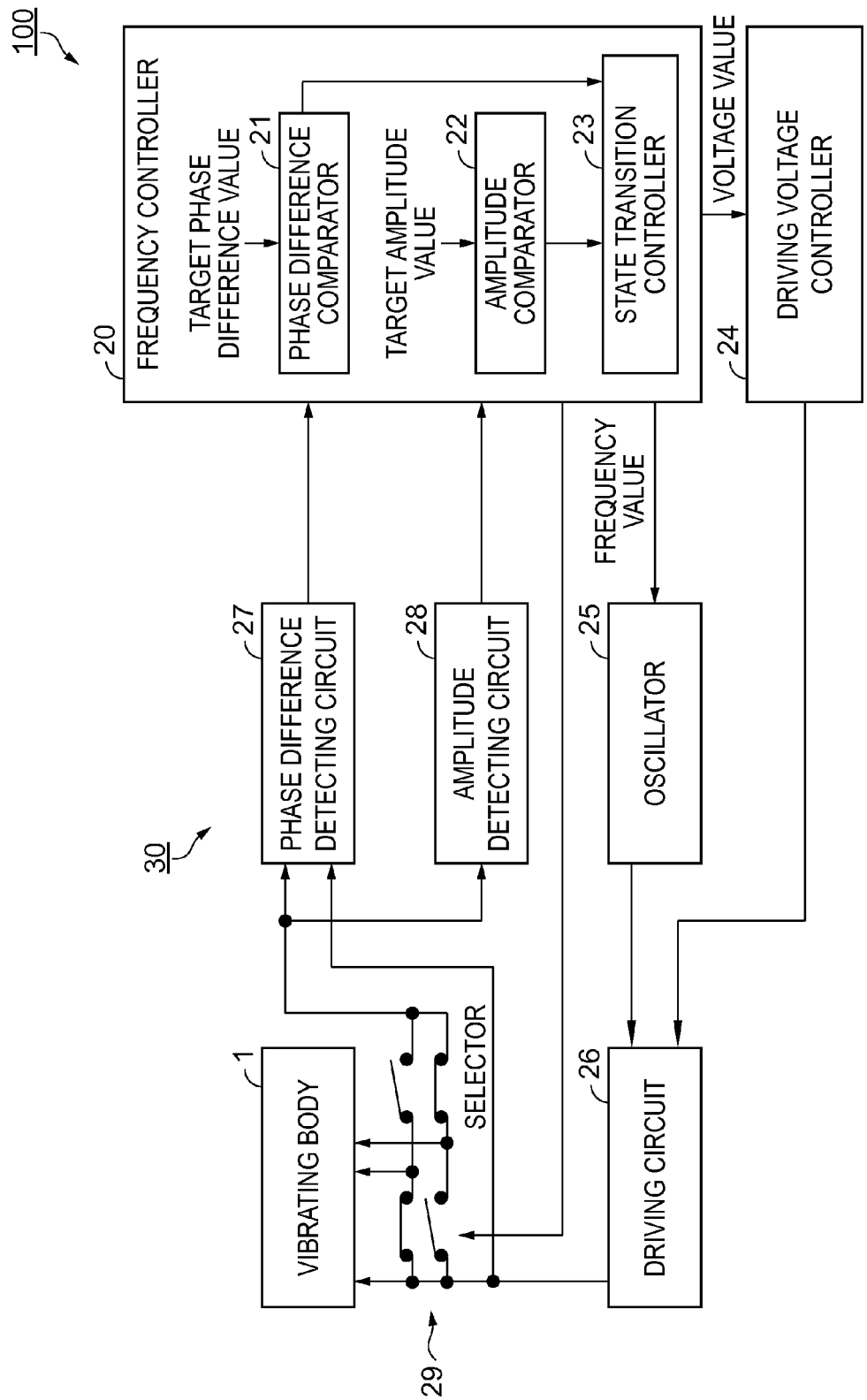
FIG. 3 is a block diagram illustrating the configuration of a driving controller of the piezoelectric actuator according to the first embodiment.

As illustrated in FIGS. 1A and 1B, a piezoelectric actuator 100 includes a vibrating body 1, a rotor 2, a holding member 3, a bias spring 4, a base 18, and a driving controller (see FIG. 3). The piezoelectric actuator 100 is a piezoelectric motor including a rotating rotor 2 as a driven body. The vibrating body 1, the rotor 2, the holding member 3, and the bias spring 4 are formed on the base 18.

As illustrated by a plan view in FIG. 1A, the vibrating body 1 has an approximately rectangular shape having a short side 1a and a long side 1b. In the following description, a direction along the short side 1a will be referred to as a lateral direction, and a direction along the long side 1b will be referred to as a longitudinal direction. As illustrated in FIG. 1B, the vibrating body 1 is a stacked body in which a vibrating plate 10 and a pair of piezoelectric devices 11 disposed on both the front and rear surfaces of the vibrating plate 10, respectively.

The vibrating plate 10 is formed of a planar member made from a rigid material such as a metal or a resin, and for example, is made from a stainless steel having a conductive property. The pair of piezoelectric devices 11 is fixed to the vibrating plate 10 by a fixing means such as an adhesive or an alloy solder. The piezoelectric device 11 includes a piezoelectric layer 13, a first electrode 12, and a second electrode 14.

The piezoelectric layer 13 is formed in a planar shape. The piezoelectric layer 13 is made from a piezoelectric material exhibiting an electromechanical transduction effect, and for example, is formed using a metal oxide having a perovskite structure expressed by $ABO_3$ as a material. Examples of such a metal oxide include lead zirconate titanate ($Pb(Zr,Ti)O_3$: PZT) and lithium niobate ($LiNbO_3$).

The first electrode 12 is provided on a side of the piezoelectric layer 13 close to the vibrating plate 10 and is formed over the approximately entire surface of the piezoelectric layer 13. The first electrode 12 serves as a common electrode of the piezoelectric device 11. The first electrodes 12 of the pair of piezoelectric devices 11 are electrically connected via the vibrating plate 10. The first electrodes 12 and the second electrodes 14 are formed by deposition, sputtering, or the like using a conductive metal such as Ni, Au, or Ag as a material.

The second electrode 14 is provided on a side of the piezoelectric layer 13 opposite to the first electrode 12 and is divided in the in-plane direction into multiple sub-electrodes by a groove. As illustrated in FIG. 1A, this groove divides the second electrode 14 approximately equally in the lateral direction of the piezoelectric device 11 into three sub-electrodes, and each of two sub-electrodes on both outer sides in the lateral direction among the three divided sub-electrodes is further approximately equally divided in the longitudinal direction into two sub-electrodes. In this way, the second electrode 14 is divided into five electrode portions of electrode portions 14a, 14b, 14c, 14d, and 14e. The electrode portions 14a, 14b, 14c, 14d, and 14e are electrically separated from each other as individual electrodes.

The electrode portion 14a disposed at the center in the lateral direction among the five electrode portions of the second electrode 14 functions as a longitudinal vibration electrode. The electrode portions 14b and 14e disposed on both outer sides in the lateral direction of the electrode portion 14a so as to form a diagonal pair with the electrode portion 14a interposed therebetween function as first flexural vibration electrodes. Moreover, the electrode portions 14c and 14d disposed so as to form a diagonal pair crossing the diagonal pair of the electrode portions 14b and 14e with the electrode portion 14a interposed therebetween function as second flexural vibration electrodes.

In the piezoelectric device 11, a region where the electrode portion 14a is disposed serves as a longitudinal vibration excitation region which excites longitudinal vibration in the longitudinal direction of the piezoelectric device 11. In contrast, each of regions on both sides in the lateral direction of the longitudinal vibration excitation region, where the electrode portions 14b and 14e and the electrode portions 14c and 14d are disposed, respectively, serves as a flexural vibration excitation region which excites flexural vibration in the lateral direction of the piezoelectric device 11.

The first electrode 12 and the second electrode 14 (the electrode portions 14a, 14b, 14c, 14d, and 14e) are electrically connected to the driving controller 30 via electrode wirings (not illustrated) or the like. The driving controller 30 supplies a driving signal for controlling the piezoelectric device 11 and controls the frequency and power of the driving signal in order to drive the piezoelectric actuator 100 with high efficiency and in a stable state.

The vibrating plate 10 includes a sliding portion 15 that is extended from one end in the longitudinal direction thereof so as to protrude toward the rotor 2 farther than the piezoelectric device 11. The sliding portion 15 is in contact with a side surface (circumferential surface) of the rotor 2.

Moreover, the vibrating plate 10 includes a pair of arm portions 16 that is provided at the center in the longitudinal direction thereof so as to extend toward both outer sides in the lateral direction. A through-hole is formed in the arm portion 16 so as to penetrate in the thickness direction, and the arm portion 16 is fixed to the holding member 3 via a screw inserted into the through-hole. In this way, the vibrating body 1 is held on the holding member 3 in a state where the vibrating body 1 can perform longitudinal vibration and flexural vibration about the arm portion 16.

The rotor 2 has a disk shape and is disposed on a side of the vibrating body 1 where the sliding portion 15 is provided. The rotor 2 is held so as to be rotatable about a rod-shaped shaft 2a that stands on the base 18. The rotating speed of the rotor 2 can be detected by an optical or magnetic rotation sensor (not illustrated) that is provided near the rotor 2.

The base 18 includes a pair of slide portions 18a. The pair of slide portions 18a are disposed on both outer sides in the lateral direction of the vibrating body 1 so as to extend in the longitudinal direction. The holding member 3 is supported on the base 18 so as to be slidable along the slide portions 18a.

A bias spring 4 is provided between the base 18 and a side of the holding member 3 opposite to the rotor 2. The bias spring 4 biases the vibrating body 1 toward the rotor 2 via the holding member 3, and by this biasing force, the sliding portion 15 is in contact with the rotor 2 with predetermined force. The biasing force of the bias spring 4 is appropriately set so that appropriate frictional force is generated between the rotor 2 and the sliding portion 15. In this way, vibration of the vibrating body 1 is efficiently transferred to the rotor 2 via the sliding portion 15.

The piezoelectric actuator 100 may further include a mechanism that increases or decreases the rotating speed of the rotor 2 and transfers the increased or decreased rotating speed. When such a mechanism is included, it is possible to increase or decrease the rotating speed of the rotor 2 to obtain a desired rotating speed.

Figure 2A:
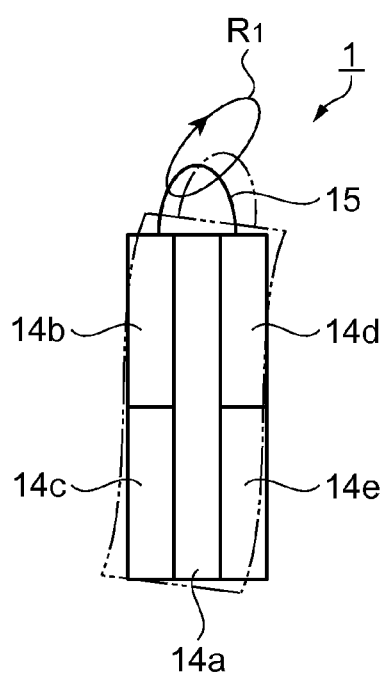
FIGS. 2A and 2B are diagrams illustrating vibration behavior of a vibrating body according to the first embodiment.
Figure 2B:
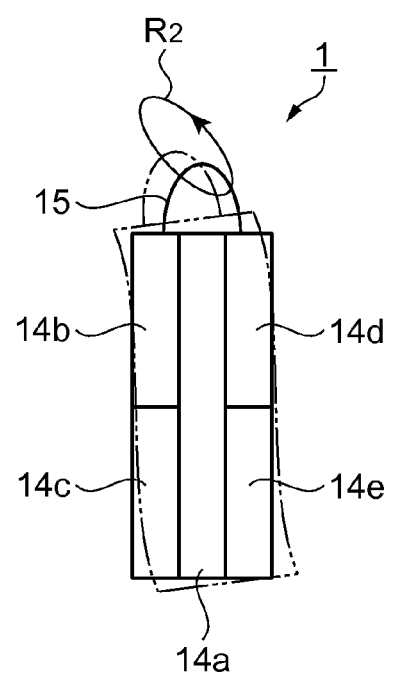

Subsequently, the operation of the piezoelectric actuator 100 is described. FIGS. 2A and 2B are diagrams illustrating a vibrational behavior of the vibrating body according to the first embodiment. Specifically, FIG. 2A is a diagram illustrating a vibrating state of the vibrating body 1 when a driving signal is supplied between the first electrode 12 (see FIG. 1B) and the electrode portions 14a, 14b, and 14e of the second electrode 14. Moreover, FIG. 2B is a diagram illustrating a vibrating state of the vibrating body 1 when a driving signal is supplied between the first electrode 12 and the electrode portions 14a, 14c, and 14d of the second electrode 14.

In the vibrating state illustrated in FIG. 2A, when a driving signal is supplied to the electrode portion 14a which is a longitudinal vibration electrode, longitudinal vibration is excited in the vibrating body 1 so that the vibrating body expands or contracts in the longitudinal direction.

Moreover, when a driving signal is supplied to the electrode portions 14b and 14e which are the first flexural vibration electrodes, flexural vibration is excited in the vibrating body 1 so that the vibrating body 1 bends in the longitudinal direction. The longitudinal vibration and the flexural vibration are combined so that vibration indicated by the two-dot chain line is excited in the vibrating body 1, whereby the sliding portion 15 slides so as to rotate clockwise along an elliptical orbit R1. In this way, the rotor 2 rotates counterclockwise as indicated by an arrow in FIG. 1A.

In this case, the vibrating body 1 (the piezoelectric device 11) vibrates also in the second flexural vibration electrodes (the electrode portions 14c and 14d) to which a driving signal is not supplied. By this vibration, the piezoelectric device 11 generates electricity in the region of the second flexural vibration electrodes, and a detection signal (AC current) corresponding to vibration is output from the electrode portions 14c and 14d.

In the vibrating state illustrated in FIG. 2B, when a driving signal is supplied to the electrode portion 14a which is the longitudinal vibration electrode, longitudinal vibration is excited in the vibrating body 1 so that the vibrating body 1 expands or contracts in the longitudinal direction. Moreover, when a driving signal is supplied to the electrode portions 14c and 14d which are the second flexural vibration electrodes, flexural vibration is excited in the vibrating body 1 so that the vibrating body 1 bends in the lateral direction. The longitudinal vibration and the flexural vibration are combined so that vibration indicated by the two-dot chain line is excited in the vibrating body 1, whereby the sliding portion 15 slides so as to rotate counterclockwise along an elliptical orbit R2 by being inclined to be bilaterally symmetrical to the elliptical orbit R1. In this way, the rotor 2 rotates clockwise opposite to the arrow illustrated in FIG. 1A.

In this case, when the vibrating body 1 vibrates, the piezoelectric device 11 generates electricity in the region of the first flexural vibration electrodes (the electrode portions 14b and 14e) to which the driving signal is not supplied. In this way, a detection signal (AC current) corresponding to the vibration of the vibrating body 1 is output from the electrode portions 14b and 14e.

As above, in the piezoelectric actuator 100 of the present embodiment, when supplying a driving signal between the first electrode 12 and the second electrode 14, by switching between a case of selecting the first flexural vibration electrode (the electrode portions 14b and 14e) in addition to the longitudinal vibration electrode (the electrode portion 14a) in the second electrode 14 and a case of selecting the second flexural vibration electrode (the electrode portions 14c and 14d), it is possible to rotate the rotor 2 both clockwise and counterclockwise.

Moreover, in the piezoelectric actuator 100, in a state where the sliding portion 15 slides so as to properly rotate along the elliptical orbit R1 or the elliptical orbit R2, the rotor 2 rotates stably and the rotating speed and torque reach substantially its maximum. In the present embodiment, such a driving state will be referred to as an optimum elliptical driving state.

Driving Controller

Next, the configuration of the driving controller of the piezoelectric actuator 100 will be described with reference to FIG. 3. FIG. 3 is a block diagram illustrating the configuration of the driving controller of the piezoelectric actuator according to the first embodiment. As illustrated in FIG. 3, the driving controller 30 includes a frequency controller 20 as a controller, a driving voltage controller 24, an oscillator 25, a driving circuit 26 as a driving unit, a phase difference detecting circuit 27 as a phase difference detector, an amplitude detecting circuit 28, and a selector 29.

The phase difference detecting circuit 27 detects a phase difference between a driving signal and a detection signal detected based on the vibration of the vibrating body 1 and outputs a signal corresponding to the detected phase difference to the frequency controller 20 (a phase difference comparator 21). The amplitude detecting circuit 28 detects the amplitude of the detection signal detected based on the vibration of the vibrating body 1 and outputs a signal corresponding to the detected amplitude to the frequency controller 20 (an amplitude comparator 22).

The frequency controller 20 includes the phase difference comparator 21, the amplitude comparator 22, and a state transition controller 23. The phase difference comparator 21 compares the phase difference output by the phase difference detecting circuit 27 with a target phase difference value which is a predetermined reference value. The amplitude comparator 22 compares the amplitude output by the amplitude detecting circuit 28 with a target amplitude value. The target phase difference value and the target amplitude value are values set in advance and are stored in a storage unit (not illustrated) included in the frequency controller 20. The storage unit may be a memory or the like provided separately from the frequency controller 20.

The state transition controller 23 outputs a voltage value per predetermined time and a frequency value per predetermined time to the driving voltage controller 24 and the oscillator 25, respectively, based on the phase difference comparison result by the phase difference comparator 21 and the amplitude comparison result by the amplitude comparator 22. Moreover, the state transition controller 23 has four different states, and transitions the state thereof and adjusts the voltage value per predetermined time and the frequency value per predetermined time in respective states based on the phase difference comparison result by the phase difference comparator 21 and the amplitude comparison result by the amplitude comparator 22.

The oscillator 25 generates a driving signal to be supplied to the vibrating body 1 (the piezoelectric device 11). The oscillator 25 is configured of a direct digital synthesizer (DDS) and adjusts the frequency (hereinafter referred to as a driving frequency) of the driving signal based on the frequency value per predetermined time output from the state transition controller 23.

The driving voltage controller 24 outputs an instruction to increase or decrease the voltage of the driving signal to the driving circuit 26 based on the voltage value per predetermined time output from the state transition controller 23. The driving circuit 26 increases or decreases the voltage of the driving signal based on the instruction of the driving voltage controller 24 and outputs the driving signal to the vibrating body 1 (the piezoelectric device 11). In this way, the voltage value is controlled as the power of the driving signal supplied to the vibrating body 1.

The selector 29 switches the electrode to which the driving signal is supplied and the electrode to which the detection signal is output among the electrodes of the piezoelectric device 11. By the switching of the selector 29, one of the first and second flexural vibration electrodes is selected, and the vibrating state illustrated in FIG. 2A and the vibrating state illustrated in FIG. 2B are switched. In this way, it is possible to rotate the rotor 2 (see FIG. 1A) both clockwise and counterclockwise.

Figure 4:
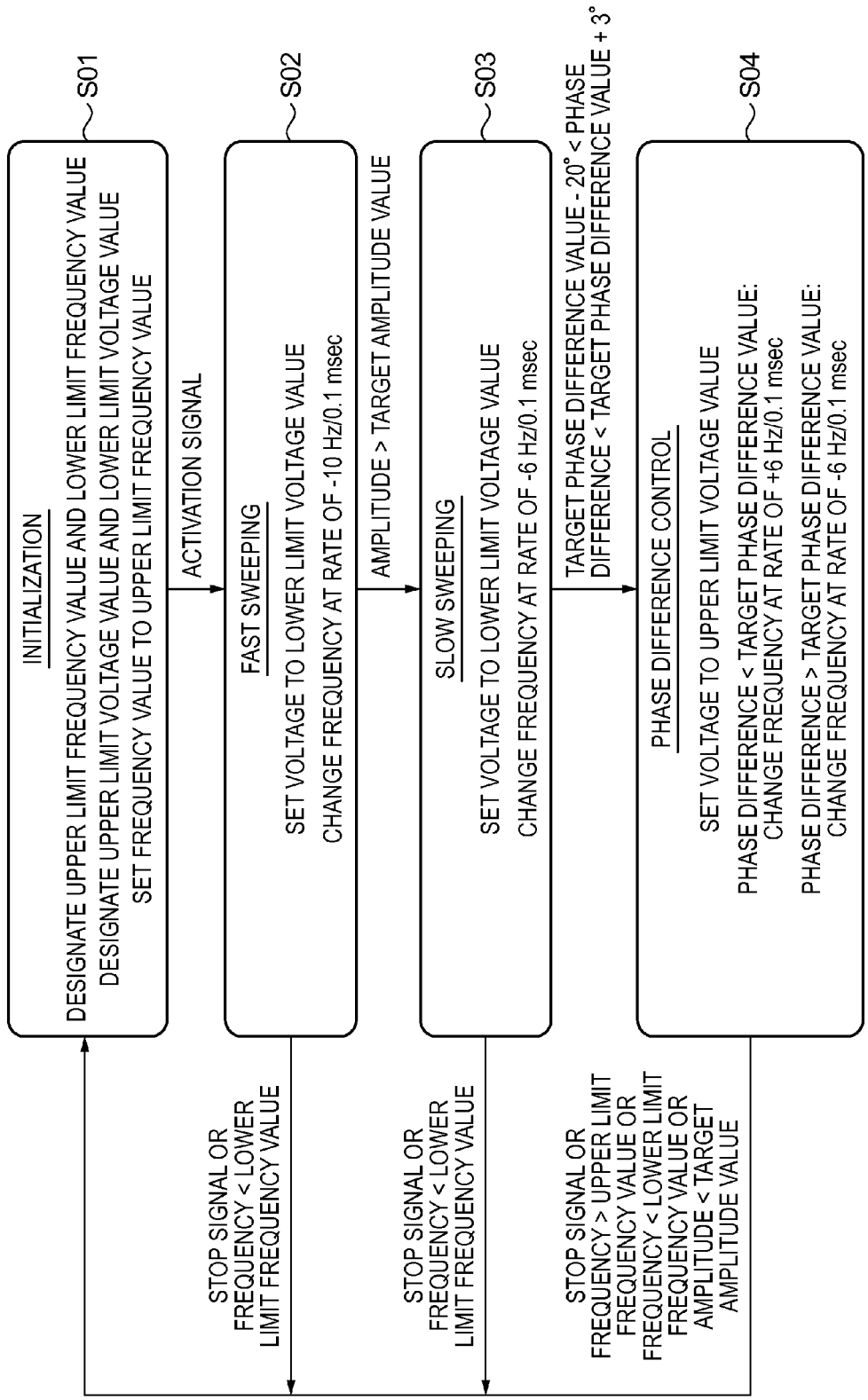
FIG. 4 is a diagram illustrating a state transition of the piezoelectric actuator according to the first embodiment.

Subsequently, a driving control method of the piezoelectric actuator 100 will be described with reference to FIG. 4. FIG. 4 is a diagram illustrating a state transition of the piezoelectric actuator according to the first embodiment. As illustrated in FIG. 4, the piezoelectric actuator 100 has four different control states which are an initialization state of S01, a fast sweeping state of S02, a slow sweeping state of S03, and a phase difference control state of S04. Transition between these different states and control of the respective states are performed by the state transition controller 23.

The piezoelectric actuator 100 is in a stopped state in the initialization state of S01. When an activation signal is input, the piezoelectric actuator 100 transitions to the phase difference control state of S04 through the fast sweeping state of S02 and the slow sweeping state of S03 and is driven with high efficiency in the phase difference control state of S04.

In the initialization state of S01, the state transition controller 23 designates a frequency range and a voltage range in which the piezoelectric actuator 100 is driven. The upper limit value (upper limit frequency value) and the lower limit value (lower limit frequency value) of the frequencies when performing sweeping control are designated as the frequency range. Moreover, the lower limit voltage value which is a predetermined voltage value for driving the piezoelectric actuator 100 and the lower limit voltage value lower than the predetermined voltage value are designated as the voltage range. The upper limit voltage value is a voltage at which a desired rotating speed and a desired torque are obtained. The lower limit voltage value is preferably a voltage at which the piezoelectric device 11 vibrates so that the phase difference can be detected, and a voltage at which the rotor 2 does not rotate.

Moreover, in the initialization state of S01, the state transition controller 23 sets the frequency value output to the oscillator 25 at the time of activation to the upper limit frequency value. That is, in the fast sweeping state of S02 and the slow sweeping state of S03 after activation, sweeping control of frequency is performed in such a way as to sweep frequencies from a high frequency side to a low frequency side. The initialization state of S01 is maintained until an activation signal is input.

When an activation signal is input in the initialization state of S01, the electrode to which the driving signal is supplied and the electrode to which the detection signal is output are set by the selector 29, and the rotating direction of the rotor 2 is determined. Moreover, the driving signal is supplied to the vibrating body 1 (the piezoelectric device 11) by the driving circuit 26, and the piezoelectric actuator 100 transitions to the fast sweeping state of S02.

In the fast sweeping state of S02, the state transition controller 23 sets the voltage value output to the driving voltage controller 24 to the lower limit voltage value. In this way, the vibration (amplitude) of the vibrating body 1 is suppressed to be low. Moreover, the state transition controller 23 changes the frequency value output to the oscillator 25 from the upper limit frequency value at a certain rate of change (for example, −10 Hz/0.1 msec).

In the fast sweeping state of S02, when the amplitude comparator 22 detects that the amplitude output from the amplitude detecting circuit 28 is greater than a target amplitude value, the state transition controller 23 transitions to the slow sweeping state of S03. Moreover, in the fast sweeping state of S02, when the frequency value output to the oscillator 25 becomes lower than the lower limit frequency value, or when a stop signal is input, the state transition controller 23 transitions to the initialization state of S01.

In the slow sweeping state of S03, the state transition controller 23 maintains a state where the voltage value output to the driving voltage controller 24 is set to the lower limit voltage value. Moreover, the state transition controller 23 changes the frequency value output to the oscillator 25 at a rate of change (for example, −6 Hz/0.1 msec) lower than the rate of change in the fast sweeping state of S02.

In the slow sweeping state of S03, when the phase difference comparator 21 detects that the phase difference output from the phase difference detecting circuit 27 falls within a predetermined range, for example, a range between "target phase difference value −20°" and "target phase difference value +3°," the state transition controller 23 transitions to the phase difference control state of S04. Moreover, in the slow sweeping state of S03, when the frequency value output to the oscillator 25 becomes lower than the lower limit frequency value, or when a stop signal is input, the state transition controller 23 transitions to the initialization state of S01.

The piezoelectric actuator 100 of the present embodiment can increase an activation speed by sweeping frequencies at a high speed in the fast sweeping state of S02 and reliably transition to the phase difference control state of S04 by switching to the slow sweeping state of S03 and sweeping frequencies at a low speed.

In the phase difference control state of S04, the state transition controller 23 sets the voltage value output to the driving voltage controller 24 to the upper limit voltage value. In this way, the piezoelectric actuator 100 can obtain a desired rotating speed and a desired torque.

Moreover, in the phase difference control state of S04, the state transition controller 23 performs control so that the phase difference output from the phase difference detecting circuit 27 approaches a target phase difference value. That is, when the phase difference output from the phase difference detecting circuit 27 is smaller than a target phase difference value, the state transition controller 23 changes the frequency value output to the oscillator 25 at a certain rate of change (for example, +6 Hz/0.1 msec). When the phase difference output from the phase difference detecting circuit 27 is larger than the target phase difference value, the state transition controller 23 changes the frequency value output to the oscillator 25 at a certain rate of change (for example, −6 Hz/0.1 msec).

By this control, the phase difference output from the phase difference detecting circuit 27 approaches the target phase difference value, and the frequency value output to the oscillator 25 converges substantially to an optimum driving frequency described later. In this way, since the piezoelectric actuator 100 can be driven along an optimum elliptical orbit, even when the voltage value output to the driving voltage controller 24 is set to the upper limit voltage value, it is possible to suppress reverse rotation of the rotor 2, abrasion of the distal end of the sliding portion 15, destruction of the sliding portion 15, and the like.

In the phase difference control state of S04, the state transition controller 23 transitions to the initialization state of S01 when the frequency value output to the oscillator 25 becomes higher than the upper limit frequency value or lower than the lower limit frequency value, or when the amplitude output from the amplitude detecting circuit 28 becomes smaller than the target amplitude value, or when a stop signal is input.

Figure 5A:
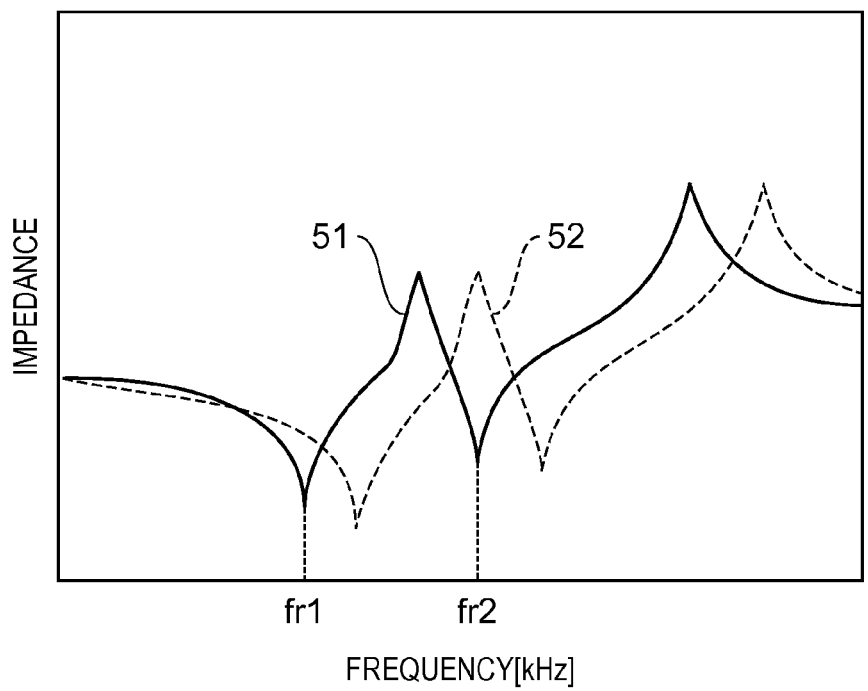
FIGS. 5A and 5B are diagrams illustrating the driving frequency of the piezoelectric actuator according to the first embodiment.
Figure 5B:
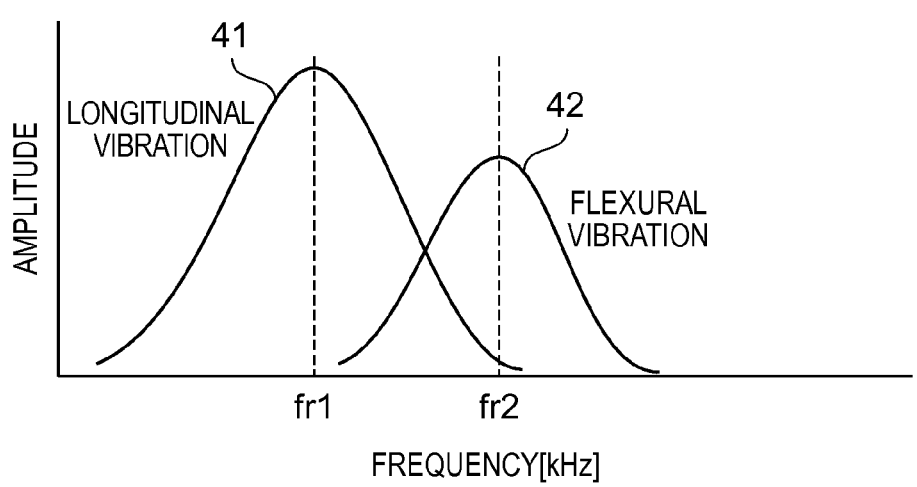

Here, the optimum driving frequency will be described with reference to FIGS. 5A and 5B. FIGS. 5A and 5B are diagrams illustrating the driving frequency of the piezoelectric actuator according to the first embodiment. Specifically, FIG. 5A is a diagram illustrating the relation between a driving frequency and an impedance, and FIG. 5B is a diagram illustrating the relation between a driving frequency, amplitude of longitudinal vibration, and amplitude of flexural vibration.

As indicated by the solid line 51 in FIG. 5A, two resonance points where impedance reaches its minimum appear with respect to the driving frequency. Among these resonance points, the point corresponding to the lower frequency is a resonance point of longitudinal vibration (fr1) and the point corresponding to the higher frequency is a resonance point of flexural vibration (fr2). The amplitude of the longitudinal vibration reaches its maximum at the longitudinal resonance frequency fr1 as indicated by a solid line 41 in FIG. 5B, and the amplitude of the flexural vibration reaches its maximum at the flexural resonance frequency fr2 as indicated by a solid line 42.

A frequency between the longitudinal resonance frequency fr1 of the longitudinal vibration and the flexural resonance frequency fr2 of the flexural vibration is referred to as the optimum driving frequency. When the vibrating body is driven at the optimum driving frequency, since the amplitude of both the longitudinal vibration and the flexural vibration is secured, the piezoelectric actuator 100 is driven with high efficiency. Moreover, by setting the longitudinal resonance frequency fr1 and the flexural resonance frequency fr2 so as to approach each other, it is possible to further increase the amplitude of the longitudinal vibration and the flexural vibration at the optimum driving frequency. The upper limit frequency value and the lower limit frequency value of the piezoelectric actuator 100 can be determined by considering the longitudinal resonance frequency fr1 and the flexural resonance frequency fr2 of the vibrating body 1 and the like.

The impedance characteristics of the vibrating body 1 change with a temperature. In FIG. 5A, a solid line 51 represents the impedance characteristics when the temperature is 25° C., and the broken line 52 represents the impedance characteristics when the temperature is 0° C. The resonance points of the longitudinal vibration and the flexural vibration move toward the high frequency side when the temperature decreases and move toward the low frequency side when the temperature increases. Thus, when the temperature of the vibrating body 1 changes due to heating caused by the ambient temperature or the vibration of the vibrating body 1 itself, frictional force with the rotor 2, or the like, the resonance frequency also changes.

As above, since the resonance frequency changes with a change of a temperature or a load, when the piezoelectric actuator 100 is activated, control is performed so that the phase difference control state of S04 is reliably and quickly attained by sweeping the frequencies in S02 and S03 so that the driving frequency approaches the resonance frequency. In this way, when the piezoelectric actuator 100 is used in a place where the temperature changes frequently, it is possible to attain the optimum elliptical driving state quickly even when the resonance frequency changes at the time of activation.

Moreover, even when the optimum elliptical driving state is attained for now, since the resonance frequency changes with a change of temperature, control is performed so as to increase or decrease the driving frequency based on a difference between the phase difference and a target phase difference value in the phase difference control state of S04. In this way, even when the driving frequency varies during driving so that the phase difference deviates from a predetermined range, it is possible to maintain a stable driving state of the piezoelectric actuator 100 by adjusting the driving frequency so that the phase difference approaches the target phase difference value.

Figure 6:
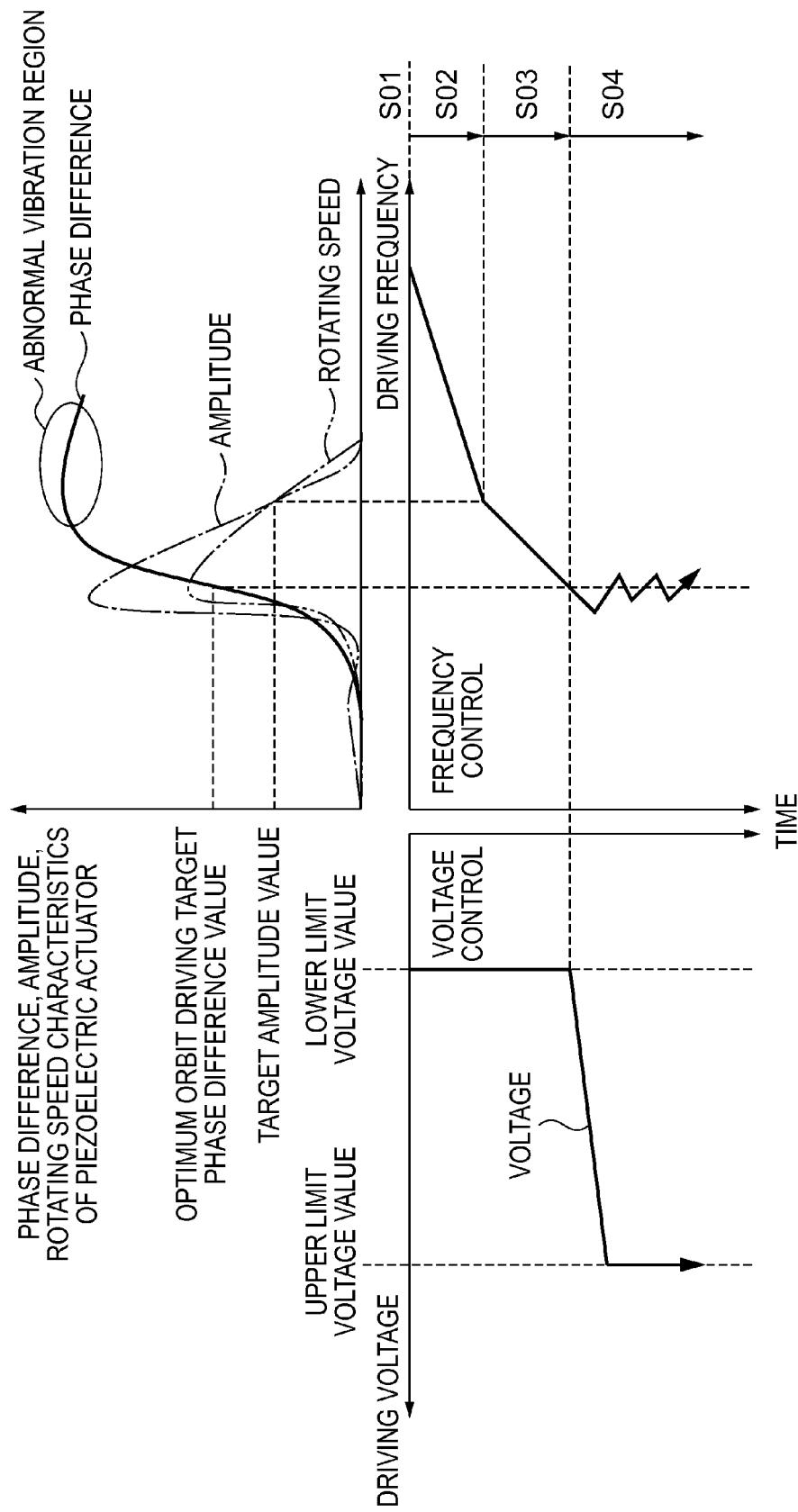
FIG. 6 is a diagram illustrating an example of driving control of the piezoelectric actuator according to the first embodiment.

Next, an example of driving control of the piezoelectric actuator 100 will be described with reference to FIG. 6. FIG. 6 is a diagram illustrating an example of driving control of the piezoelectric actuator according to the first embodiment. In FIG. 6, the horizontal axis advancing rightward from the center of the figure represents a change of the driving frequency, and the frequency increases as it advances rightward. The horizontal axis advancing leftward from the center of the figure represents a change of the driving voltage, and the voltage increases as it advances leftward. The vertical axis advancing upward from the center of the figure represents a change of the phase difference, amplitude, and rotating speed of the piezoelectric actuator 100, and the respective values increase as it advances upward. The vertical axis advancing downward from the center of the figure represents that the time elapses as it advances downward.

When the piezoelectric actuator 100 is activated from the initialization state of S01, the driving frequency changes from the upper limit frequency value toward the lower side in the fast sweeping state of S02. Then, the rotor 2 starts rotating, and the amplitude of the vibrating body 1 increases and the rotating speed of the rotor 2 also increases.

In this case, the phase difference output from the phase difference detecting circuit 27 becomes much greater than the target phase difference value at which the optimum elliptical driving state can be realized. When a predetermined voltage value is supplied in a state where the phase difference is in an abnormal vibrating region of such a value, the sliding portion 15 enters into an abnormal state where it becomes difficult for the sliding portion 15 to follow the normal elliptical orbits R1 and R2. As a result, the rotation of the rotor 2 may become unstable to rotate in a reverse direction (a direction opposite to the intended rotating direction). Accordingly, the distal end of the sliding portion 15 may be worn out, and the sliding portion 15 may be destroyed.

Thus, in the present embodiment, control is performed so as to set the voltage of the driving signal to the lower limit voltage value until the phase difference control state of S04 is attained, so that the sliding portion 15 does not enter into an abnormal state. Moreover, the driving frequency is changed at a high speed in the fast sweeping state of S02 so as to quickly skip a frequency range where the optimum elliptical driving state is not obtained. Since the driving frequency is changed from the high frequency side, that is, from a side where the impedance of the vibrating body 1 is high, it is possible to prevent a large amount of current from flowing in the sweeping state. In this way, it is possible to decrease power consumption at the time of activation.

In the fast sweeping state of S02, when the amplitude output from the amplitude detecting circuit 28 becomes larger than the target amplitude value, the state transitions to the slow sweeping state of S03 so that the rate of change of the driving frequency is decreased. By decreasing the rate of change of frequency to be smaller than that of the fast sweeping state of S02, the phase difference is suppressed from exceeding the target phase difference value.

With a change of the driving frequency toward the low frequency side, the amplitude of the vibrating body 1 and the rotating speed of the rotor 2 increase further, and the phase difference decreases. Moreover, when the phase difference approaches the target phase difference value, both the amplitude of the vibrating body 1 and the rotating speed of the rotor 2 reach their maximum. That is, when the phase difference is controlled to be a value within a predetermined range which is set as a value near the target phase difference value, it is possible to realize the optimum elliptical driving state.

When the phase difference falls within the predetermined range, the state transitions to the phase difference control state of S04. In the phase difference control state of S04, since the optimum elliptical driving state is obtained, the voltage of the driving signal is set to the upper limit voltage value, and the amplitude of the vibrating body 1 and the rotating speed of the rotor 2 are increased. Moreover, by increasing or decreasing the driving frequency so as to follow a variation of the resonance frequency, it is possible to maintain stable driving with high efficiency.

As above, in the present embodiment, in the sweeping control of S02 and S03 in which the phase difference between the driving signal and the detection signal is out of a predetermined range, the voltage of the driving signal is decreased to be smaller than the value of the state of S04 where the phase difference is within the predetermined range. Therefore, in a frequency range where the sliding portion 15 is not likely to follow a normal elliptical orbit when the phase difference is outside a predetermined range, the vibration of the vibrating body 1 can be suppressed more than when the phase difference is in a stable driving state within the predetermined range. In this way, since the reverse rotation, the abrasion and destruction of the distal end of the sliding portion 15, and the like resulting from the inability of the sliding portion 15 to follow the normal elliptical orbits R1 and R2 are suppressed, it is possible to reliably activate the piezoelectric actuator 100 in a stable state.

Second Embodiment

Piezoelectric Actuator

Next, a driving controller of a piezoelectric actuator according to a second embodiment will be described.

Figure 7:
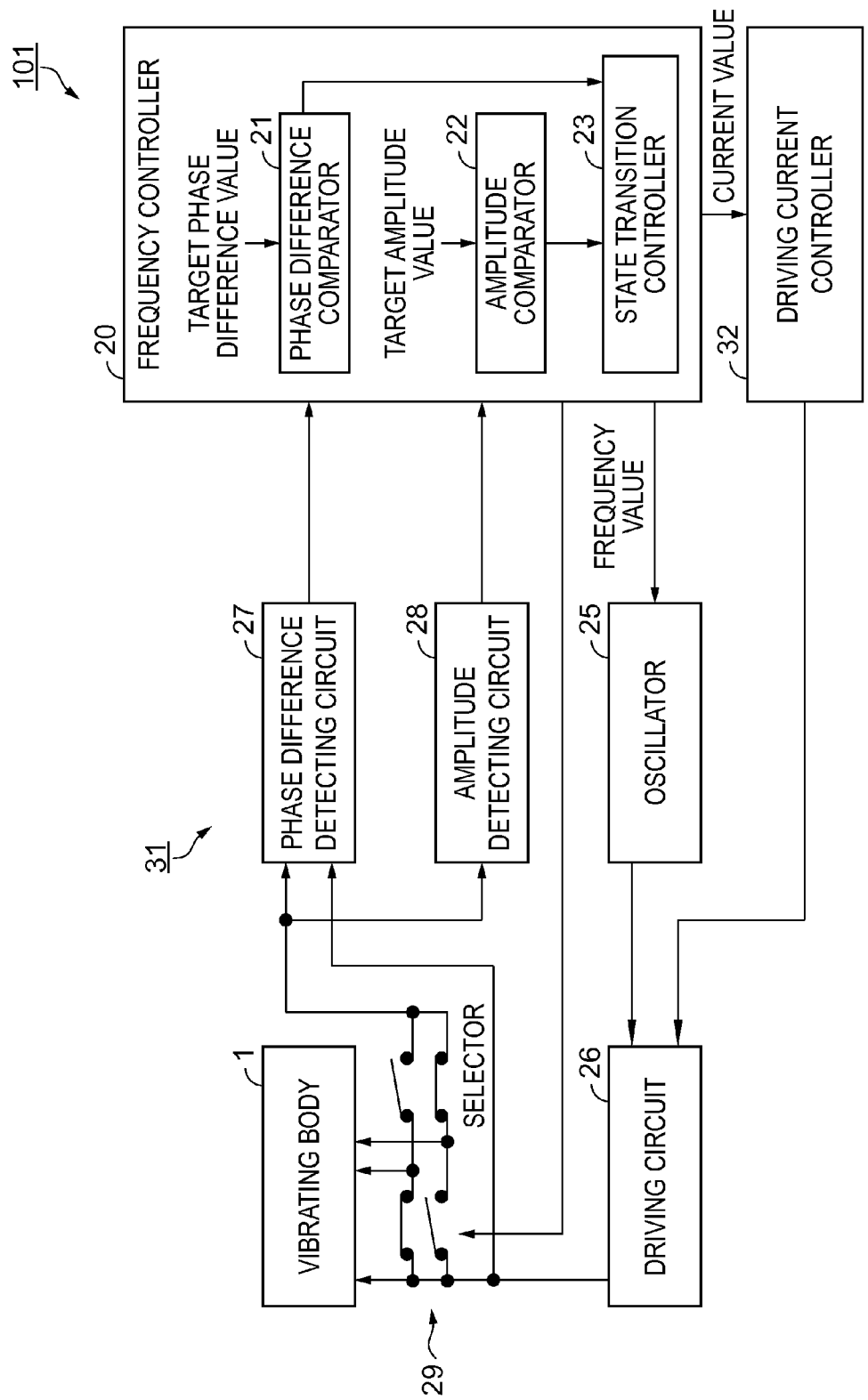
FIG. 7 is a block diagram illustrating the configuration of a driving controller of a piezoelectric actuator according to a second embodiment.

FIG. 7 is a block diagram illustrating the configuration of the driving controller of the piezoelectric actuator according to the second embodiment.

A piezoelectric actuator 101 according to the second embodiment is different from the piezoelectric actuator 100 according to the first embodiment, in that a driving controller 31 includes a driving current controller 32 instead of the driving voltage controller 24, and current is controlled as the power of the driving signal. The other configuration is substantially the same as that of the driving controller 31. Thus, in this example, the configuration of the driving controller 31 will be described. Moreover, the same constituent components as the first embodiment will be denoted by the same reference numerals, and the description thereof will not be provided.

As illustrated in FIG. 7, the driving controller 31 included in the piezoelectric actuator 101 according to the second embodiment includes a frequency controller 20, the driving current controller 32, an oscillator 25, a driving circuit 26, a phase difference detecting circuit 27, an amplitude detecting circuit 28, and a selector 29.

The state transition controller 23 of the frequency controller 20 outputs a current value per predetermined time and a frequency value per predetermined time to the driving current controller 32 and the oscillator 25, respectively, based on the phase difference comparison result by the phase difference comparator 21 and the amplitude comparison result by the amplitude comparator 22. Moreover, the state transition controller 23 adjusts the current value per predetermined time and the frequency value per predetermined time in respective states of S01, S02, S03, and S04.

The driving current controller 32 outputs an instruction to increase or decrease the current of the driving signal to the driving circuit 26 based on the current value per predetermined time output from the state transition controller 23. The driving circuit 26 increases or decreases the current of the driving signal based on the instruction of the driving current controller 32 and outputs the driving signal to the vibrating body 1 (the piezoelectric device 11). In this way, the current value is controlled as the power of the driving signal.

Figure 8:
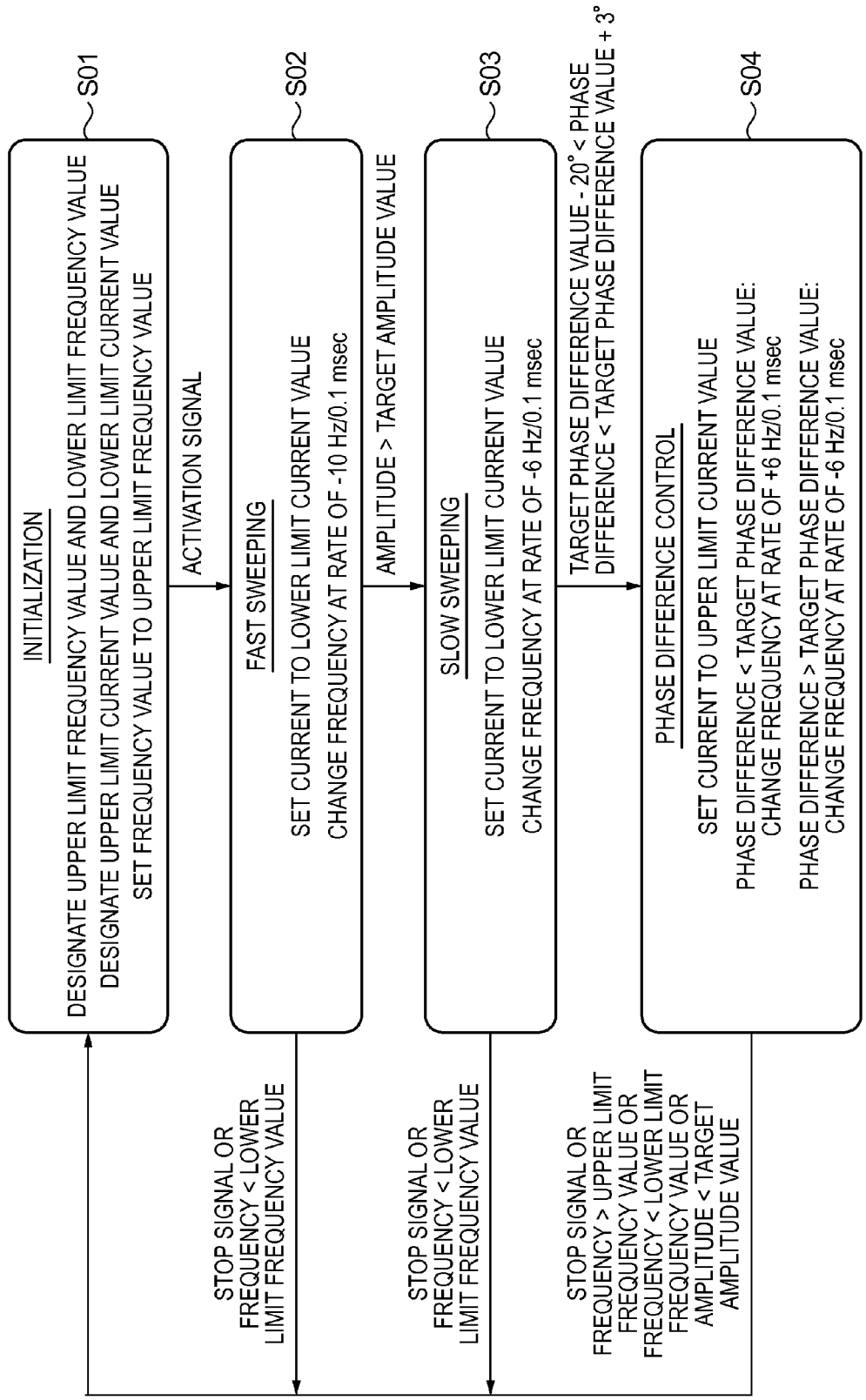
FIG. 8 is a diagram illustrating a state transition of the piezoelectric actuator according to the second embodiment.

Subsequently, a driving control method of the piezoelectric actuator 101 will be described with reference to FIG. 8. FIG. 8 is a diagram illustrating a state transition of the piezoelectric actuator according to the second embodiment. As illustrated in FIG. 8, the piezoelectric actuator 101 has four different control states of S01, S02, S03, and S04 similarly to the piezoelectric actuator 100 of the first embodiment.

In the initialization state of S01, the state transition controller 23 designates a frequency range and a current range in which the piezoelectric actuator 101 is driven. The upper limit current value and the lower limit current value in which the piezoelectric actuator 101 is driven are designated as the current range.

In the fast sweeping state of S02, the state transition controller 23 sets the current value output to the driving current controller 32 to the lower limit current value. In the slow sweeping state of S03, the current value output to the driving current controller 32 is also maintained to the lower limit current value. In the phase difference control state of S04, the state transition controller 23 sets the current value output to the driving current controller 32 to the upper limit current value.

In the driving controller 31 according to the second embodiment, in the sweeping control of S02 and S03 where the phase difference between the driving signal and the detection signal is outside a predetermined range, the current of the driving signal is decreased to be lower than the value of the state of S04 where the phase difference is within the predetermined range. Therefore, in a frequency range where the sliding portion 15 is not likely to follow a normal elliptical orbit when the phase difference is outside a predetermined range, the vibration of the vibrating body 1 can be suppressed. In this way, similarly to the first embodiment, since the reverse rotation, the abrasion and destruction of the distal end of the sliding portion 15, and the like resulting from the inability of the sliding portion 15 to follow the normal elliptical orbits R1 and R2 are suppressed, it is possible to reliably activate the piezoelectric actuator 101 in a stable state.

Moreover, in the driving controller 31 according to the second embodiment, by controlling the current, it is possible to maintain the power substantially to be constant even when the impedance of the vibrating body 1 varies. In this way, even when the impedance of the vibrating body 1 varies, it is possible to stably drive the torque of the piezoelectric actuator 101 and the rotating speed of the rotor 2.

Third Embodiment
Robot Hand

Figure 9A:
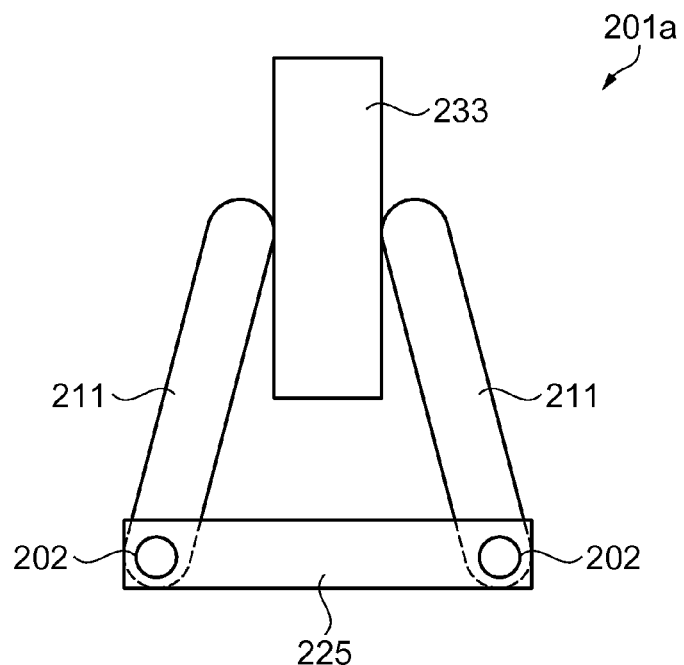
FIGS. 9A and 9B are schematic diagrams illustrating the configuration of a robot hand according to a third embodiment.
Figure 9B:
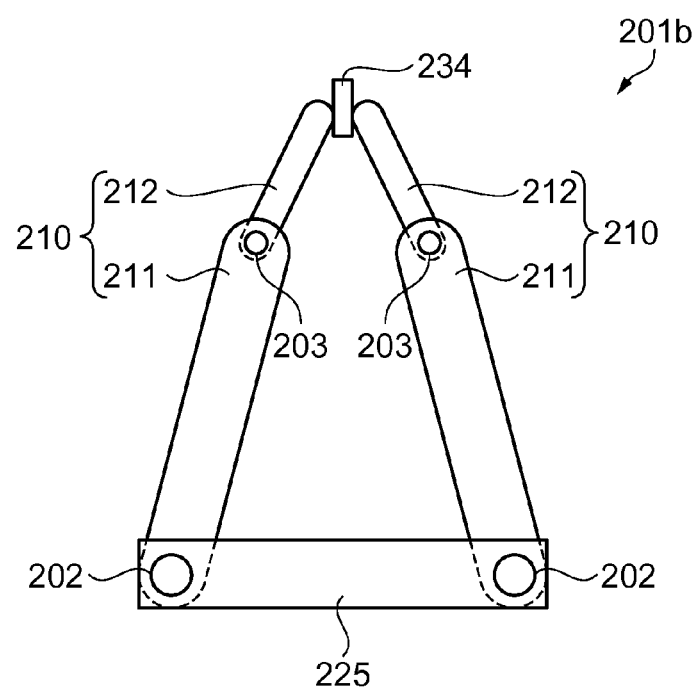

Next, a schematic configuration of a robot hand according to a third embodiment will be described. FIGS. 9A and 9B are schematic diagrams illustrating the configuration of a robot hand according to the third embodiment.

Specifically, FIG. 9A is a diagram illustrating a robot hand including one stage of a joint portion, and FIG. 9B is a diagram illustrating a robot hand including two stages of a joint portion.

A robot hand 201a illustrated in FIG. 9A includes a base portion 225 and a pair of fingers 211. A pair of joint portions 202 is provided at both sides in the extension direction of the base 225. One end of each of the pair of fingers 211 is connected to the base 225 by the joint portion 202. The piezoelectric actuator 100 (or the piezoelectric actuator 101) described above is disposed in the pair of joint portions 202, and by the driving of the piezoelectric actuator, the pair of fingers 211 is pivoted in different directions about the joint portions 202 as a pivot axis. In this way, a member 233 can be grasped by the other ends of the pair of fingers 211.

A robot hand 201b illustrated in FIG. 9B further includes a pair of fingers 212 in addition to the configuration of the robot hand 201a, and the fingers 211 and 212 form a finger portion 210. A joint portion 203 is disposed at each of the other ends of the pair of fingers 211, and one end of the finger 212 is connected to the finger 211 by the joint portion 203. The piezoelectric actuator 100 (or the piezoelectric actuator 101) described above is disposed in the pair of joint portions 203, and by the driving of the piezoelectric actuator, the pair of fingers 212 is pivoted about the joint portions 203 as a pivot axis. In this way, by bending the pair of finger portions 210, a member 234 can be grasped by the other ends of the fingers 212. According to the configuration of the robot hand 201b, since the pair of finger portions 210 (the fingers 211 and 212) is connected by two stages of joints of the joint portions 202 and 203, it is ideal for grasping the member 234 smaller than the member 233.

In the robot hand 201a and the robot hand 201b according to the third embodiment, the joint portions 202 and 203 include the piezoelectric actuator 100 or the piezoelectric actuator 101 capable of being activated in a stable state and maintaining a stable driving state. As a result, it is possible to provide the robot hand 201a or 201b which performs the operation of the fingers 211 and 212 grasping the member 233 or 234 in a stable state.

Fourth Embodiment
Robot

Figure 10:
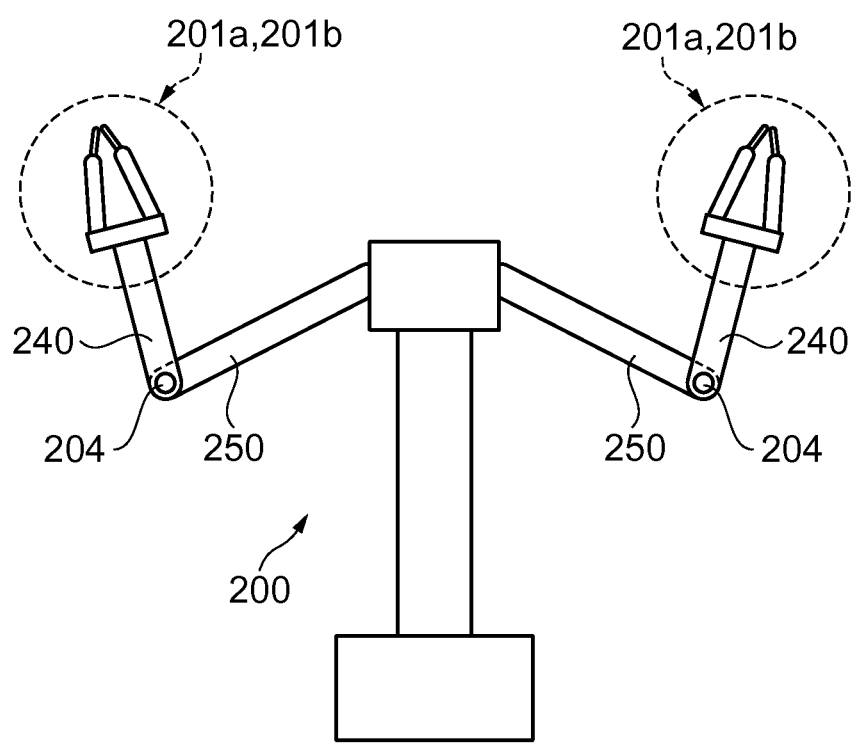
FIG. 10 is a schematic diagram illustrating the configuration of a robot according to a fourth embodiment.

Next, a schematic configuration of a robot according to a fourth embodiment will be described. FIG. 10 is a schematic diagram illustrating the configuration of a robot according to the fourth embodiment. As illustrated in FIG. 10, a robot 200 includes a pair of arms 240, a pair of arms 250, and a pair of robot hands 201a (or robot hands 201b).

The arms 240 and 250 are connected together by a joint portion 204. The piezoelectric actuator 100 (or the piezoelectric actuator 101) described above is disposed in a pair of joint portions 204, and by the driving of the piezoelectric actuator, the arm 240 is pivoted with respect to the arm 250.

In the robot 200 according to the fourth embodiment, the joint portion 204 includes the piezoelectric actuator 100 or the piezoelectric actuator 101 capable of being activated in a stable state and maintaining a stable driving state, and the robot 200 includes the robot hand 201a (or the robot hand 201b). As a result, it is possible to provide the robot 200 which performs the grasping of a member and the operation of the arm 240 in a stable state.

The embodiments described above illustrate just one aspect of the invention, and various modifications and applications can be made within the scope of the invention. Modification examples will be described below.

Modification Example 1

For example, in the embodiments described above, although the frequencies are swept from the upper limit frequency value to the lower limit frequency value at the time of activation, the invention is not limited to this. The frequencies may be swept from the lower limit frequency value to the upper limit frequency value at the time of activation. According to the driving control method of the above embodiments, since the reverse rotation, the abrasion and destruction of the distal end of the sliding portion, and the like in a frequency range where the optimum elliptical driving state is not achieved are suppressed, it is possible to reliably activate the piezoelectric actuator in a stable state.

Modification Example 2

Moreover, in the embodiments described above, although the phase difference between the driving signal and the detection signal detected from the vibrating body 1 is detected, and the driving of the piezoelectric actuator 100 or 101 is controlled based on the detected phase difference, the invention is not limited to this. The detection signals of the longitudinal vibration and the flexural vibration may be detected from the vibrating body 1, and the driving of the piezoelectric actuator 100 or 101 may be controlled based on the phase difference between the driving signal and these detection signals.

Modification Example 3

Moreover, in the embodiments described above, although the driving frequency is controlled based on the phase difference between the driving signal and the detection signal or the phase difference between respective detection signals, the invention is not limited to this. For example, a resistor may be provided in the driving circuit 26 driving the piezoelectric actuator 100 or 101, and a change of the current value flowing through the piezoelectric actuator 100 or 101 may be detected as a voltage value. In this way, the driving frequency may be controlled based on the current value flowing through the piezoelectric actuator 100 or 101.

Modification Example 4

Moreover, in the embodiments described above, the rotor 2 is driven to rotate in two directions by the selector 29 switching the first flexural vibration electrode and the second flexural vibration electrode formed in the piezoelectric device 11, the invention is not limited to this. The driving phases of the longitudinal vibration electrode and the first flexural vibration electrode or the driving phases of the longitudinal vibration electrode and the second flexural vibration electrode may not necessarily be the same.

Furthermore, the resonance frequencies of the longitudinal vibration and the flexural vibration are made identical or close to each other, and three-phase driving is realized using three phases such that the first flexural vibration electrode has a phase delayed from that of the longitudinal vibration electrode, and the second flexural vibration electrode has a phase reverse to that of the first flexural vibration electrode. During reverse rotation, three-phase driving is realized using three phases such that the second flexural vibration electrode has a phase delayed from that of the longitudinal vibration electrode, and the first flexural vibration electrode has a phase reverse to that of the second flexural vibration electrode. The detection signal may be separately prepared by the embodiments or the modification examples, and the driving of the piezoelectric actuator 100 or 101 may be controlled.

The entire disclosure of Japanese Patent Application No. 2011-127024, filed Jun. 7, 2011 is expressly incorporated by reference herein.

What is claimed is:

1. A piezoelectric actuator comprising:
a vibrating body including a piezoelectric device that operates a moving member;
a driving unit that supplies a driving signal to the piezoelectric device;
an oscillator that supplies a frequency to the driving unit to make the driving signal;
a phase difference detector that detects a phase difference between the driving signal and a detection signal detected based on vibration of the vibrating body; and
a control unit that controls the frequency and a voltage for the driving signal based on a fast sweeping state, a slow sweeping state and a phase difference control state of the piezoelectric actuator, the control unit having a state transition controller that supplies a frequency value to the oscillator, wherein
the state transition controller chances the frequency value by a first frequency change rate during the fast sweeping state,
the state transition controller changes the frequency value by a second frequency change rate that is smaller than the first frequency change rate during the slow sweeping state,
the control unit sets the voltage to an upper voltage value when the phase difference is within a predetermined range by changing the frequency during the phase difference control state, and the control unit sets the voltage to a lower voltage value, which is smaller than the upper voltage value, when the phase difference is outside the predetermined range, and
when the driving signal, which corresponds to the lower voltage value, is supplied to the piezoelectric device, the piezoelectric device vibrates so that the phase difference detector detects the phase difference and the piezoelectric device operates the moving member.

2. The piezoelectric actuator according to claim 1, wherein the control unit changes the frequency based on a difference between the phase difference and a predetermined reference value when the phase difference is within the predetermined range.

3. A robot hand comprising the piezoelectric actuator according to claim 1.

4. A robot hand comprising the piezoelectric actuator according to claim 2.

5. A robot comprising the robot hand according to claim 3.

6. A robot comprising the robot hand according to claim 4.

7. A robot hand comprising:
a vibrating body including a piezoelectric device that operates a moving member;
a driving unit that supplies a driving signal to the piezoelectric device;
an oscillator that supplies a frequency to the driving unit to make the driving signal;
a phase difference detector that detects a phase difference between the driving signal and a detection signal detected based on vibration of the vibrating body;
a control unit that controls the frequency and a voltage for the driving signal based on a fast sweeping state, a slow sweeping state and a phase difference control state of the piezoelectric actuator, the control unit having a state transition controller that supplies a frequency value to the oscillator; and
a plurality of finger portions, wherein
the state transition controller changes the frequency value by a first frequency change rate during the fast sweeping state,
the state transition controller changes the frequency value by a second frequency change rate that is smaller than the first frequency change rate during the slow sweeping state,
the control unit sets the voltage to an upper voltage value when the phase difference is within a predetermined range by changing the frequency during the phase difference control state, and the control unit sets the voltage to a lower voltage value, which is smaller than the upper voltage value, when the phase difference is outside the predetermined range, and
when the driving signal, which corresponds to the lower voltage value, is supplied to the piezoelectric device, the piezoelectric device vibrates so that the phase difference detector detects the phase difference and the piezoelectric device operates the moving member.

8. A robot comprising:
a vibrating body including a piezoelectric device that operates a moving member;

a driving unit that supplies a driving signal to the piezoelectric device;

an oscillator that supplies a frequency to the driving unit to make the driving signal;

a phase difference detector that detects a phase difference between the driving signal and a detection signal detected based on vibration of the vibrating body;

a control unit that controls the frequency and a voltage for the driving signal based on a fast sweeping state, a slow sweeping state and a phase difference control stare of the piezoelectric actuator, the control unit having a state transition controller that supplies a frequency value to the oscillator; and a pivotable arm portion, wherein the state transition controller changes the frequency value by a first frequency change rate during the fast sweeping state, the state transition controller chances the frequency value by a second frequency change rate that is smaller than the first frequency chance rate during the slow sweeping state, the control unit sets the voltage to an upper voltage value when the phase difference is within a predetermined range by changing the frequency during the phase difference control state, and the control unit sets the voltage to a lower voltage value, which is smaller than the upper voltage value, when the phase difference is outside the predetermined range, and when the driving signal, which corresponds to the lower voltage value, is supplied to the piezoelectric device, the piezoelectric device vibrates so that the phase difference detector detects the phase difference and the piezoelectric device operates the moving member.

\* \* \* \* \*